United States Patent [19]

Takano et al.

[11] 4,240,283
[45] Dec. 23, 1980

[54] APPARATUS FOR TESTING POWER TRANSMISSION BELT

[75] Inventors: Hiroshi Takano, Miki; Yasuhiro Hashimoto, Kobe; Mutsuo Takesako, Akashi, all of Japan

[73] Assignee: Mitsuboshi Belting Ltd., Kobe, Japan

[21] Appl. No.: 959,132

[22] Filed: Nov. 9, 1978

[51] Int. Cl.³ .................. G01N 3/56; G01M 13/02
[52] U.S. Cl. ......................................... 73/7; 73/118; 73/812
[58] Field of Search ............... 73/810, 812, 851, 7, 73/9, 118, 134, 133 R, 162

[56] References Cited

U.S. PATENT DOCUMENTS

| | | | |
|---|---|---|---|
| 1,749,297 | 3/1930 | Norman | 73/7 |
| 3,956,929 | 5/1976 | Jenkins, et al. | 73/133 R |

FOREIGN PATENT DOCUMENTS 442390  4/1975  U.S.S.R. ..................... 73/133 R

*Primary Examiner*—Charles A. Ruehl
*Attorney, Agent, or Firm*—Sughrue, Rothwell, Mion, Zinn and Macpeak

[57] ABSTRACT

An apparatus for testing a power transmission belt is disclosed, wherein a test belt is mounted between a pair of pulleys secured to first ends, respectively, of a pair of shafts disposed in parallel and a drive belt is mounted, through idlers, between another pair of pulleys respectively secured to the other ends of the shafts. One of the shafts is supported on a movable plate adapted to be moved in conformity with the length of the test belt. Pitch diameters of these pulleys are determined to exert torque on the shafts to thereby apply tension to the belts. The idlers are disposed so as to avoid displacement of the drive belt regardless of the length of the test belt, and one of the idlers is movably disposed to further control tension of the drive belt.

11 Claims, 3 Drawing Figures

APPARATUS FOR TESTING POWER TRANSMISSION BELT

BACKGROUND OF THE INVENTION

This invention relates to an apparatus for testing power transmission belts, and more particularly to a type thereof in which a drive belt and a test belt are subject to constant load and slippage by the rotational ratio differential between the drive and test belts. The apparatus is particularly effective for testing frictional power transmission belts such as a V-belt, flat belt, roundish belt, and poly-V-belt having a zig-zag pattern in cross section at the inner surface thereof, or a synchronous transmission belt such as a toothed belt.

According to the conventional apparatus of this type, a constant load is applied to the shaft of a drive pulley. For example, as shown in FIG. 1, a water wheel 6 is connected to a driven shaft 2 which is connected to a driven pulley $B_1$ in order to provide a constant load by pouring a constant amount of water onto the water wheel. A test belt 3 is mounted between the driven pulley $B_1$ and a drive pulley $A_1$ which is connected to a drive shaft 1 connected to a driving means 5. This apparatus is a so called "water brake" system, according to which the test belt 3 is subjected to a load due to the rotational timing (r.p.m) differential between the pulleys $A_1$ and $B_1$.

Another type of conventional apparatus has been proposed, in which an electrical brake is applied to the driven side to apply load to the test belt. However, in both cases, the load is obtained by the external means, such as the water wheel and the electrical brake, and therefore, power consumption would be very large, and uneconomical apparatuses would result.

In order to obviate these drawbacks, U.S. Pat. No. 3,739,632 discloses that a hydraulic rotary actuator is provided to one of the shafts to apply to the belt. However, according to this apparatus, though torque of the shaft can be easily changed, the hydraulic rotary actuator may not sustain high power, so that the belt testing operation cannot be conducted under all conditions.

Further, U.S. Pat. No. 3,956,929 discloses that one of the belts is a variable speed belt mounted between first ends of two shafts disposed in parallel and the other belt is mounted between the other ends of the shafts. Tension applied to the other belt is controlled by the variable speed belt. However, this apparatus has drawbacks in that torque applied to the test belt is disadvantageously changed. Further, the variable speed belt is required to be replaced with the another one in conformity with the length of the test belt.

SUMMARY OF THE INVENTION

It is, therefore, an object of this invention to provide an improved apparatus which permits energy minimization.

A further object is to provide an improvement of the general type of belt testing apparatus disclosed in U.S. Pat. No. 3,956,929, which improvement permits test belts of different lengths to be tested with a single drive belt and permits the tension of the drive belt to be controlled by means of a movable idler.

It is another object of this invention to provide an apparatus wherein the need for replacement of the drive belt is eliminated regardless of the length of the test belt, easily adjusting or setting the distance between the shafts to accomodate test belts of different lengths.

Briefly, and in accordance with the present invention, a first and a second shaft are rotatably secured to an upper stationary plate and an upper movable or adjustable plate, respectively. The first shaft is provided with pulleys $P_1$ and $P_2$ at the ends thereof, having pitch diameters of $d_1$ and $d_2$, respectively, and the second shaft is provided with pulleys $P_3$ and $P_4$ at the ends thereof, having pitch diameters of $d_3$ and $d_4$, respectively. A test belt is mounted between the pulleys $P_2$ and $P_4$, while a drive belt is mounted between the pulleys $P_1$ and $P_3$ via a first idler, secured to the upper movable plate, and second and third idlers each secured to lower stationary plates positioned below the upper movable and stationary plates, respectively.

One of the idlers is movably secured, so that tension applied to the drive belt is automatically controlled. Further, the pitch diameters of these pulleys are determined to have the following relationship.

$$d_1:d_3 \neq d_2:d_4$$

With this relationship, the drive and driven belts are subject to load, and slippage occurs between the belts and the pulleys, whereby constant torque is obtained in the shaft by controlling tension of the drive belt by means of the movable idler.

This invention will be described with respect to the drawings and the description of the preferred embodiment that follows.

DESCRIPTION OF THE PREFERRED EMBODIMENT

1. Principle of the Invention

Figure 1:
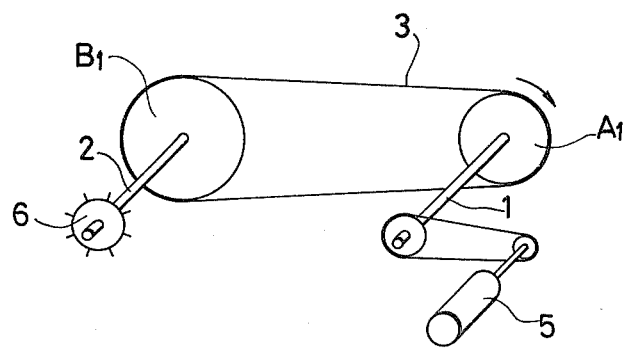
FIG. 1 is a schematic illustration showing the conventional apparatus of water brake type.
Figure 2:
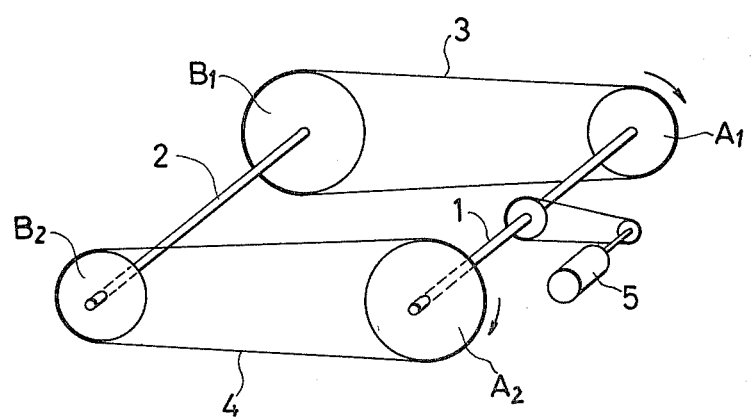
FIG. 2 is a schematic illustration showing a principle of the present invention.

FIG. 2 shows a principle of an apparatus according to this invention, wherein pulleys $A_1$ and $A_2$ are secured to the ends of a drive shaft 1, and pulleys $B_1$ and $B_2$ are secured to the ends of a driven shaft 2. The drive shaft 1 is rotated by a drive means 5 such as a motor through a belt and pulleys.

V-belts 3 and 4 are mounted between pulleys $A_1$ and $B_1$ and between $A_2$ and $B_2$ respectively. The pitch diameters of these pulleys are determined to have the relationship as below.

$$a_1:b_1 \neq a_2:b_2$$

in which;

$a_1$ is a pitch diameter of the pulley $A_1$
$a_2$ is a pitch diameter of the pulley $A_2$
$b_1$ is a pitch diameter of the pulley $B_1$ and
$b_2$ is a pitch diameter of the pulley $B_2$ When the shaft 1 rotates, pulleys $A_1$ and $A_2$ rotate at the same revolutions per minute (r.p.m.) as that of the shaft 1. On the other hand, because of the difference of the rotation transmission ratio between these belts, that is $b_1/a_1$ is not equal to $b_2/a_2$, torque is exerted on the shaft 2, so that similarly, torque is in turn exerted on the shaft 1, whereby belt 3 and 4 are driven while being subjected to constant load.

According to this apparatus, load is applied to these belts without the employment of an external means, i.e. loading is obtained within this apparatus, so that the motor merely serves to rotate the shaft and compensate for energy loss caused by friction of belts or bearings, whereby energy consumption is reduced in comparison with the conventional apparatuses.

2. Detailed Description of the Invention

Figure 3:
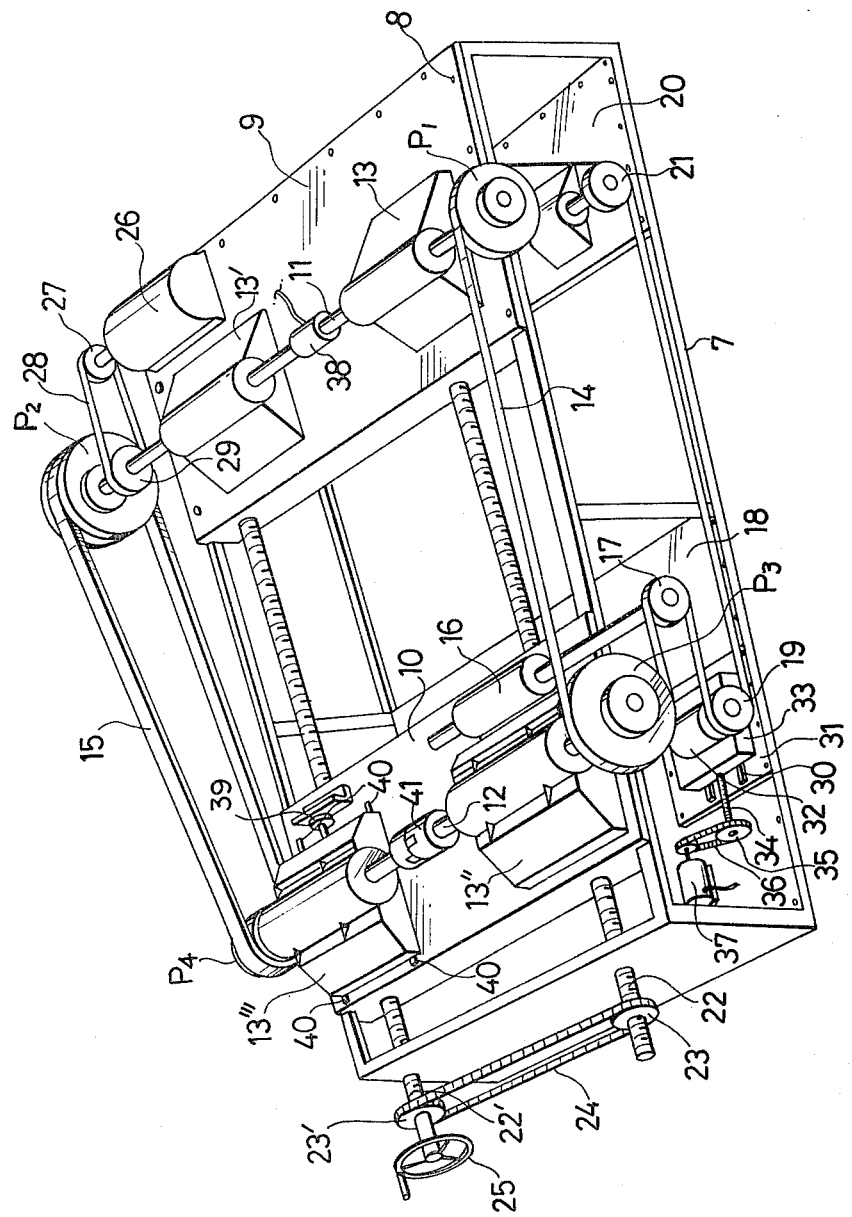
FIG. 3 shows a perspective view of an apparatus for testing power transmission belt according to the present invention.

Referring now to FIG. 3, there is illustrated an improvement of a belt testing apparatus of the general type disclosed in U.S. Pat. No. 3,956,929. A shaft 11 is rotatably secured by bearings 13 and 13' to an upper stationary plate 9 fixedly secured to a frame 7 by bolts 8, and a shaft 12 is rotatably secured by bearing 13'' and 13''' to an upper movable plate 10 slidably disposed on the frame 7. These shafts 11 and 12 are in parallel with each other. The shaft 11 has one end provided with a pulley $P_1$ for mounting a drive belt 14 such as a flat belt, and has the other end provided with a pulley $P_2$ for mounting a test belt 15 such as a V-belt, while the shaft 12 has one end provided with a pulley $P_3$ for mounting the drive belt 14 and has the other end provided with a pulley $P_4$ for mounting the test belt 15. That is, the drive belt 14 is mounted under tension between the pulleys $P_1$ and $P_3$ and the test belt 15 is mounted under tension between the pulleys $P_2$ and $P_4$.

The drive belt 14 is also mounted through idlers 17, 19 and 21. The idler 17 is rotatably secured by a bearing 16 fixedly secured to the upper movable plate 10, the idler 21 is rotatably secured to a lower stationary plate 20 positioned below the upper stationary plate 9, and the idler 19 is rotatably secured to a bearing 32 disposed on a lower stationary plate 18 positioned below the upper movable plate 10. The idler 19 serves to control tension of the drive belt 14 as described later.

Adjusting screws 22 and 22' disposed in parallel with these belts are extended into the upper movable plate 10 to move the same on the frame 7, to thereby pre-set the distance between the shafts 11 and 12 to accomodate test belts of different lengths without having to replace the drive belt. Gears 23 and 23' are fixedly secured to one ends of screws, respectively and an endless chain 24 is mounted therebetween. The screw 22' is provided with a handle 25 at the most end position thereof, so that manual rotation of the handle 25 causes the screws 22 and 22' to rotate in the same direction through gears and the chain, to thereby move the upper movable plate 10 and apply a pre-set tension to the belts 14 and 15.

Since the idler 19 adapted to precisely control tension of the drive belt is fixed to the lower stationary plate 18, and the pulley $P_3$ and the idler 17 are fixed to the upper movable plate 10, the upper movable plate 10 is merely moved in conformity with the length of the test belt 15, and therefore, replacement of the drive belt to accomodate test belts of different lengths is not required. Further with this structure, the moving stroke of the movable idler 19 can be minimized, so that mechanically simply structure is obtainable. Of course, the movable idler can be disposed on the lower stationary plate 20 instead of the plate 18.

A motor 26 is disposed on the upper stationary plate 9 to rotate the shaft 11 through a belt 28 and pulleys 27 and 29. The rotation of the shaft 11 is transmitted to rotate the shaft 12 by the drive and test belts each mounted between pulleys $P_1$ and $P_3$, and $P_2$ and $P_4$.

Pitch diameters of these pulleys are determined to have the relationship as below.

$$d_1:d_3 \neq d_2:d_4$$

in which $d_1$, $d_2$, $d_3$ and $d_4$ are the pitch diameters of pulleys $p_1$, $P_2$, $P_3$ and $P_4$, respectively.

Therefore, when these belts run, slippage occurs between the belts and pulleys because of the above relationship of pitch diameters, so that torque is exerted on the shafts 11 and 12, resulting in the belts being subjected to a load.

According to the present invention, fatigue of the belt is tested by applying load thereto and, then, visually inspecting the belt by observing such properties as cracking and peeling of the belt. However, test belts and drive belts may stretch, thereby causing the tension of these belt to be lowered during long time runs. In order to adjust the tension of the drive belt to maintain a constant, load on the test belt, the movable idler 19 is disposed to apply constant tension to the drive belt without changing the distance between shafts 11 and 12. The adjustment of the tension of the drive belt is carried out by the mechanism described below.

The idler 19 is rotatably supported by the bearing 32 fixedly mounted on a table 33. The table 33 is slidably disposed on a rail member 30 fixed on a bottom plate 31 secured to the lower stationary plate 18. A threaded bolt 34 is extended into the table 33 in parallel with the rail member 30 to permit sliding movement of the table 33 with the rotation of the bolt 34. The end portion of the bolt 34 is provided with a gear 35 in order to transmit the rotation of a geared motor 37 through an endless chain 36. The rotation of the gear motor 37 is controlled by a suitable feed back circuit from a torque detecting means 38 detecting torque variation of the shaft 11. For example, when the detecting means 38 detects reducing torque of the shaft 11, the motor 37 is energized by the feed back circuit to move the table 33 toward the left in the drawing to thereby increase the tension applied to the drive belt 14. Conversely, if the tension of the test belt is increased due to thermal contraction of the drive belt, the motor 37 is energized to move the table 33 rightwardly upon the detection signal from the torque detecting means being applied to the motor, to thereby decrease tension of the drive belt 14.

Further, according to the present invention, a load cell 39 is mounted on the upper movable plate 10 in order to continuously detect tension of the test belt 15. The load cell is in contact with the bearing 13''' positioned adjacent the test belt 15.

In order to allow tremulous movement of the bearing 13''' caused by a minute frictional resistance between the test belt and the pulleys, a pair of slots 40 are formed in the upper movable plate 10 to engage the bearing 13'''. The shaft 12 is provided with a coupling 41 between the bearings 13'' and 13'''. The coupling 41 serves to prevent the shaft 12 from being subjected to disadvantageous shearing forces due to the tremor of the bearing 13'''. That is, the load generated in the shaft 12 is not transmitted to the test belt 15 because of the provision of the coupling 41.

The drive belt and the test belt of this invention are frictional power transmission belts, such as V-belts, flat belts, poly-V-belts having a zig-zag pattern in cross section at the inner surface thereof. Alternatively, a toothed belt can be used as the test belt.

The present invention thus provides an apparatus for testing a frictional power transmission belt or a toothed belt under constant load application thereto without employing an external means by suitably selecting pitch diameters of pulleys and by providing a movable idler to control the tension of the drive belt, so that power consumption can be reduced.

Further, since the distance between the shafts can be pre-set in conformity with the length of the test belt without replacing the drive belt, and since the moving stroke of the movable idler can be minimized, the testing operation is easily realized, and a compact and economical apparatus results.

Furthermore, tension of the test belt can be detected by the load cell 39, so that testing operation can be precisely conducted.

While the invention has been described in detail and with reference to specific embodiment thereof, it will be apparent to one skilled in the art that various changes and modifications can be made therein without departing from the spirit and scope thereof.

What is claimed is:

1. In an apparatus for testing a power transmission belt including a frame, a first shaft having first and second pulleys fixed to the opposite ends thereof, a second shaft having third and fourth pulleys fixed to the opposite ends thereof, a drive belt mounted between said first and third pulleys and a test belt mounted between said second and fourth pulleys, the improvement comprising;
   (a) an upper stationary plate fixedly mounted on said frame to rotatably support said first shaft,
   (b) an upper movable plate slidably supported on said frame to rotatably support said second shaft at different pre-set fixed distances from said first shaft during testing in accordance with test belts of correspondingly different lengths,
   (c) a first idler supported on said upper movable plate,
   (d) a second idler supported on a first lower stationary plate positioned below said upper stationary plate,
   (e) a third idler supported on a second lower stationary plate positioned below said upper movable plate, said drive belt being mounted between first and third pulleys through said idlers, and one of said idlers being movably supported to change the effective length, and thus the tension, of said drive belt to maintain a constant load on said test belt, the pitch diameters of these pulleys being selected such that they have the relationship that $d_1:d_3 = d_2:d_4$, in which $d_1$, $d_2$, $d_3$ and $d_4$ are pitch diameters of said first, second, third and fourth pulleys, respectively, whereby fatigue of the test belt is observed by visual inspection thereof.

2. The apparatus as defined in claim 1, wherein said drive belt is a frictional power transmission belt such as V-belt, flat belt and poly-V-belt having zig-zag pattern in cross section at the inner surface thereof.

3. The apparatus as defined in claim 1, wherein said test belt is a frictional power transmission belt such as V-belt, flat belt, and poly-V-belt having zig-zag pattern in cross section at the inner surface thereof.

4. The apparatus as defined in claim 1, wherein said test belt is a toothed belt.

5. The apparatus as defined in claim 1, wherein said third idler is movable with respect to said lower stationary plate.

6. The apparatus as defined in claim 1 or 5, further comprising a torque detecting means provided in said first shaft, and a means for moving said third idler in response to a signal from said detecting means.

7. The apparatus as defined in claim 6, wherein said means for moving said third idler comprises a table adapted to mount said third idler, a rail members mounted on a bottom plate fixed on said second lower stationary plate, said table being movable on said rail member, a threaded bolt engaged with said table, and a geared motor adapted to rotate said threaded bolt, said motor being rotated by the signal from said torque detecting means.

8. The apparatus as defined in claim 1, wherein said second shaft is supported by bearings mounted on said upper movable plate.

9. The apparatus as defined in claim 8, further comprising a load cell in contact with one of said bearings positioned adjacent to said test belt, said one of said bearings being slightly movable on said upper movable plate.

10. The apparatus as defined in claim 1 or 9, wherein a coupling is provided in said second shaft.

11. The apparatus as defined in claim 1, further comprising a pair of adjusting screws engaged with said upper movable plate to slide the same on said frame, said screws being extended in parallel with said drive and test belts.

* * * * *